UNITED STATES PATENT OFFICE.

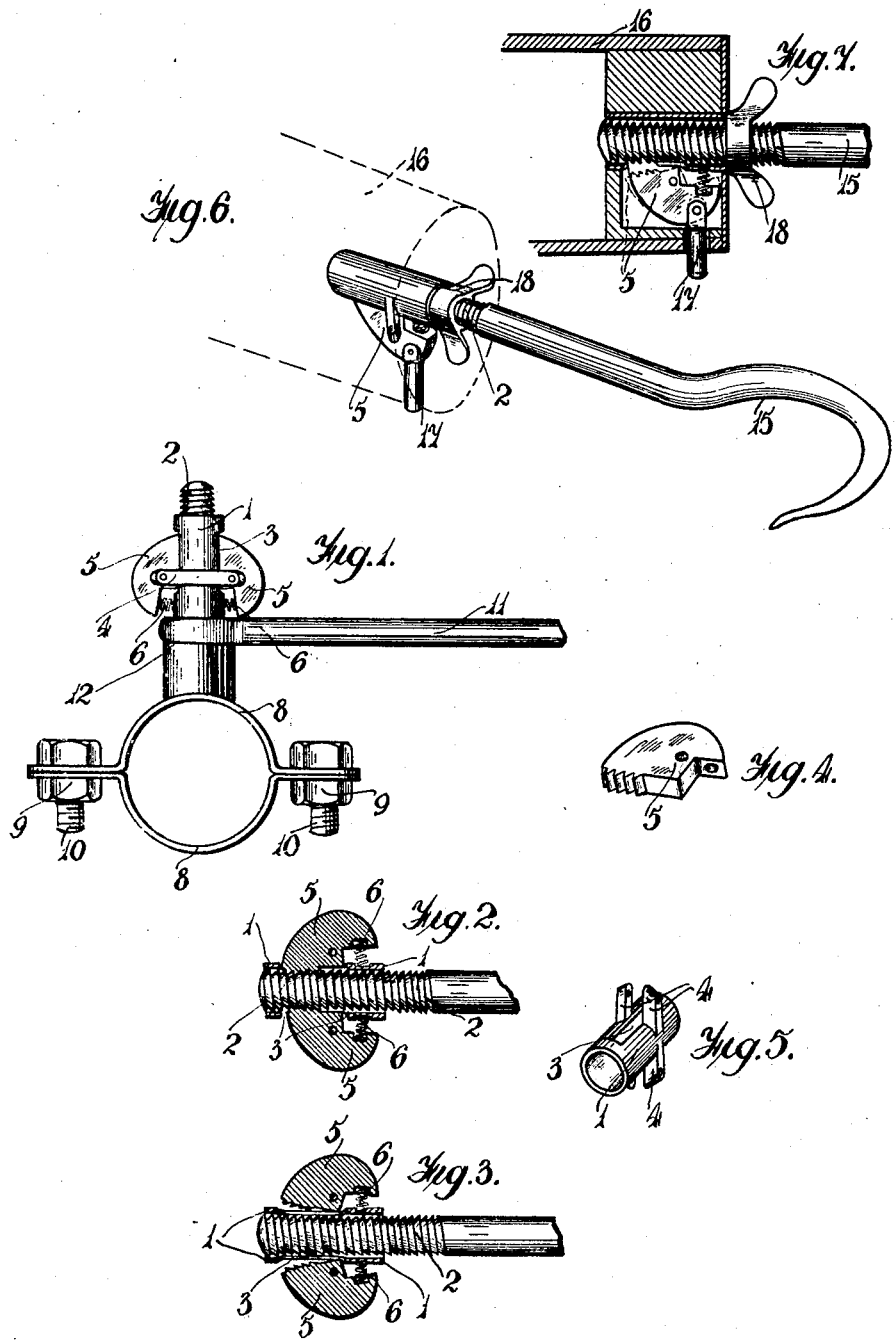

WILLIAM P. ANDERSON, NORMAN C. CLARKE, AND JOHN FALCONER WHITELAW, OF BIRMINGHAM, ENGLAND.

QUICK-LOCKING DEVICE.

1,312,942.      Specification of Letters Patent.      Patented Aug. 12, 1919.

Application filed May 8, 1918. Serial No. 233,292.

*To all whom it may concern:*

Be it known that we, WILLIAM PURVES ANDERSON, NORMAN CARLYLE CLARKE, and JOHN FALCONER WHITELAW, subjects of the King of Great Britain, residing at 140 Station road, Wylde Green, Birmingham, in the county of Warwick, England, 199 Station road, Wylde Green, aforesaid, and 170 South road, Erdington, Birmingham, aforesaid, respectively, have invented a new and useful Quick-Locking Device; and we do hereby declare the following to be a full, clear, and exact description of the same.

Our invention comprises improvements in quick locking devices for use with artificial limbs and for other purposes and refers to that class of such wherein a locking nut or its equivalent or a screw is arranged to move axially for the purpose of giving quick adjustment and adapted to be finally rotated into a tightly locked position; the object of the present invention being to provide an improved device of this kind.

According to this invention the nut or internally screwed member is provided with one or more spring controlled members each of which has one or more teeth adapted to engage with the externally screwed member, but when pressed outwardly permits relative axial movement between the nut and screw.

The spring controlled member or members may be adapted for axial movement so as to function as a nut or it may be carried by a stationary member and the externally screwed member adapted for axial movement.

Referring to the drawings:—

Figure 1. illustrates a quick locking nut according to this invention as employed with an attachment for enabling a garden rake or the like to be used by a limbless person.

Fig. 2. is a sectional view showing the locking members in their locked positions.

Fig. 3. is a similar view unlocked.

Fig. 4. illustrates one of the locking members removed.

Fig. 5. illustrates the sleeve employed for carrying the pivoted members, detached.

Fig. 6. shows a stationary form of the device as employed upon an artificial arm.

Fig. 7. is a sectional view of same.

In the preferred construction as applied to an axially movable nut and as shown upon the accompanying drawings the sleeve nut or outer member 1, which has a plain hole so as to be free to slide along the screw 2, is provided with two diametrically opposed slots 3 and lugs 4 which carry pivoted gripping members or fingers 5, a spiral or other spring 6 being arranged beneath the one end of the fingers so as to press the other end through the slot into engagement with the screw, this second end being provided with one or more teeth or partial screw threads which are adapted to engage with the externally screwed member, but capable of moving outwardly when the opposite ends of the fingers are pressed inwardly against the action of the spring.

As will be seen, when the two fingers are pressed together, as seen in Fig. 3, they disengage from the screw, when the nut may slide freely in a straight line direction or permit the externally screwed member to slide freely, but when the fingers are released the device may function as an ordinary nut or internally screwed member. In practice the nut would be moved axially whereby an approximate adjustment is quickly obtained after which it is rotated to get a final lock. In releasing, the nut is first rotated to release the frictional grip and then adjusted axially.

Preferably the externally screwed member is provided with a thread of buttress form as shown, but this is not essential as an ordinary Whitworth thread or a square or any other form of thread may be employed.

The invention is particularly applicable for the securing of a clamping or holding device for use in connection with artificial limbs. One form of holding device as shown by Figs. 1–3 includes a pair of jaws 8, 8 which are locked together by a nut 9 and screw 10, the jaws being adapted to grip a tool such as a garden rake or the like between them. The member 11 is carried by an artificial arm and has an eyed end 12 which fits upon the screw 2. The sliding nut can be quickly adjusted so as to obtain a sufficient grip to temporarily hold an article which is firmly and finally held by rotating the nut.

Another application is to a tool holder for use in connection with artificial limbs as seen in Figs. 6–7 in which the tool such as the hook 15 is provided with an externally screwed shank and the limb provided with an internally screwed quick locking device similar to that previously described. In this arrangement the fingers are released, the tool pushed into place and finally secured by rotating it. As shown one pivoted locking member or finger 5 is carried by the arm 16 and is provided with a plunger 17 all so arranged that if the plunger is released as by resting the arm on a table the finger will be released and the hook may then be freely adjusted axially or withdrawn. An ordinary wing lock nut 18 may be used or one of the construction shown in Figs. 1-3.

When a buttress thread is used it will be obvious that axial movement in the one direction may be effected without manually releasing the pivoted fingers, the fingers sliding over the threads.

One or more of the pivoted fingers may be used as desired.

The invention may be similarly applied for securing artificial hands in position or for securing parts of artificial limbs together.

The invention is also applicable to a variety of other purposes where a quick locking screw device is required, including temporary binders and the like. As applied to temporary binders the locking device might be used as a nut upon a screwed post or in another form it might be arranged as a stationary member.

What we claim then is:—

1. In a quick locking device the combination of an outer member; an externally screwed member fitting within said outer member; a pivoted gripping finger pivotally carried upon said outer member and having partial threads upon its one extremity adapted to engage with said externally screwed member; and a spring intermediate between said outer member and the finger serving to normally maintain said partial screw threads in engagement with said externally screwed member; for the purpose specified.

2. In a quick locking device the combination of an outer member; an externally screwed member fitting within said outer member and having a buttress thread; and a spring advanced gripping finger carried by said outer member and engaging said buttress thread; for the purpose specified and substantially as set forth.

3. In a quick locking device the combination of an outer member; an externally screwed member fitting within said outer member and having a buttress thread; a sleeve slidable upon said externally screwed member; a plurality of gripping fingers pivotally carried by said sleeve and having partial screw threads adapted to engage with said externally screwed member; and a spring controlling each of said fingers and serving to press them into engagement with said buttress thread; for the purpose specified.

4. In a quick locking device, the combination of an outer member, an externally screwed member fitting within said outer member, and a gripping finger pivoted upon said outer member, movable in a plane in radial relation to the screwed member and controlled by a spring which holds said finger in engagement with said externally screwed member in such manner as to permit relative axial movement when said finger is normally pressed outwardly, substantially as set forth.

In testimony whereof we affix our signatures.

W. P. ANDERSON.
N. C. CLARKE.
JOHN FALCONER WHITELAW.

Copies of this patent may be obtained for five cents each, by addressing the "Commissioner of Patents, Washington, D. C."